United States Patent [19]

Sim

[11] 4,119,088

[45] Oct. 10, 1978

[54] SOLDERING IRONS

[75] Inventor: Nigel L. Sim, Southampton, England

[73] Assignee: S. Mechele Limited, Southampton, England

[21] Appl. No.: 604,309

[22] Filed: Aug. 13, 1975

[30] Foreign Application Priority Data

Aug. 14, 1974 [GB] United Kingdom ............ 35807/74
Apr. 3, 1975 [GB] United Kingdom ............ 13744/75

[51] Int. Cl.² .............................................. B23K 3/02
[52] U.S. Cl. .................................. 126/413; 126/238; 137/505.25; 222/3
[58] Field of Search ............... 126/413, 414, 236–238, 126/229–234; 431/255; 222/3; 137/505.25

[56] References Cited

U.S. PATENT DOCUMENTS

| 1,262,047 | 4/1918 | Hicken | 126/413 |
| 1,472,087 | 10/1923 | Pike | 126/413 |
| 1,548,447 | 8/1925 | Dice | 126/413 |
| 1,568,726 | 1/1926 | Evleth | 126/413 |
| 1,662,734 | 3/1928 | Baker | 126/413 |
| 2,393,480 | 1/1946 | Schmidt | 126/413 |
| 2,888,979 | 6/1959 | Lindgren | 222/3 |
| 3,576,471 | 4/1971 | Schumacher | 431/255 |

Primary Examiner—John J. Camby
Assistant Examiner—Larry I. Schwartz
Attorney, Agent, or Firm—Bacon & Thomas

[57] ABSTRACT

A gas heated soldering iron comprises a soldering head having a chamber into which a gas/air mixture is fed by means of a bunsen tube to burn as a small, very hot flame. The chamber is surrounded by a flame suppression gauze which protects the flame and prevents any combustible gases outside the chamber being ignited. Gas is supplied to the bunsen tube from a fine jet to which the gas is fed at low pressure. The low pressure is regulated by a valve operating mechanism which cooperates with the depressible valve of a disposable gas canister to form a differential valve. The canister serves as a handle for the soldering iron, and is insulated from the soldering head.

26 Claims, 7 Drawing Figures

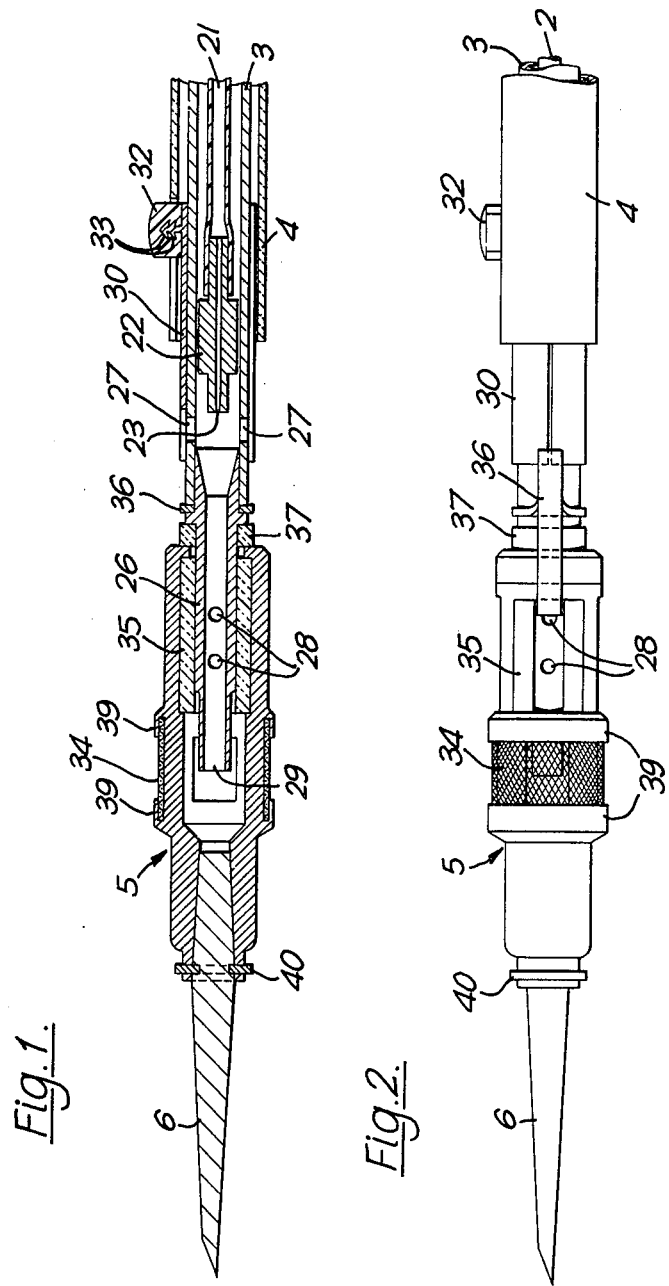

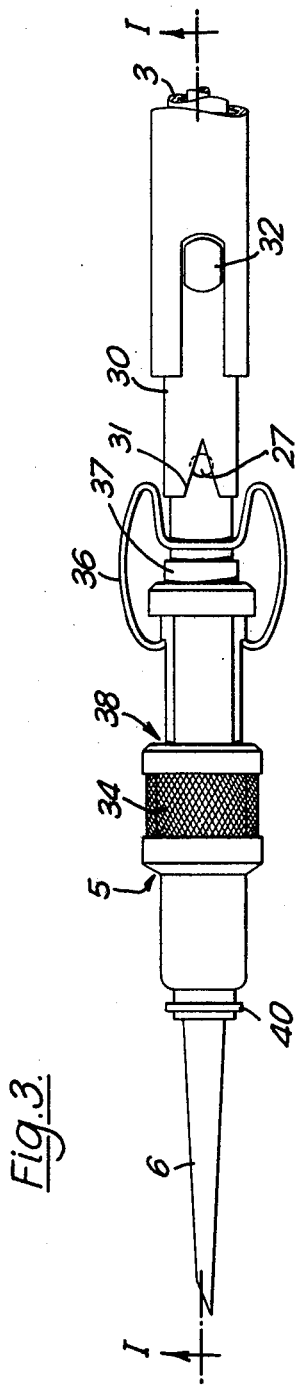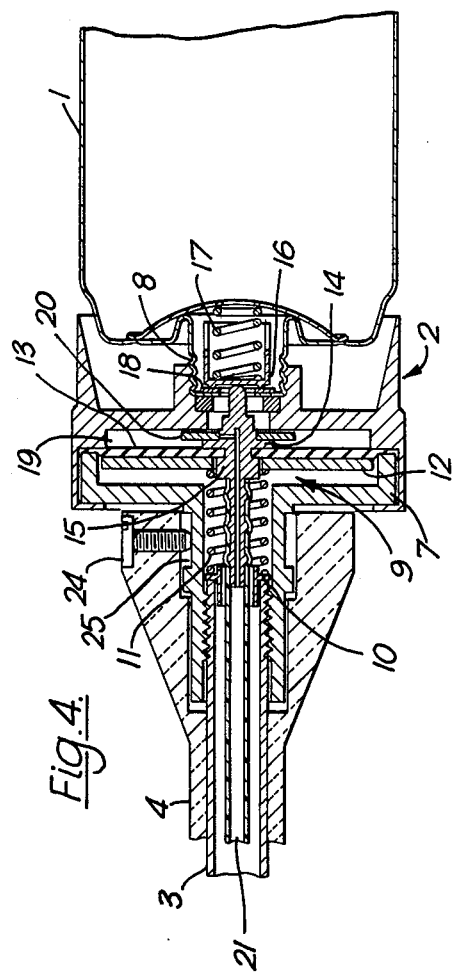
Fig.3.
Fig.4.

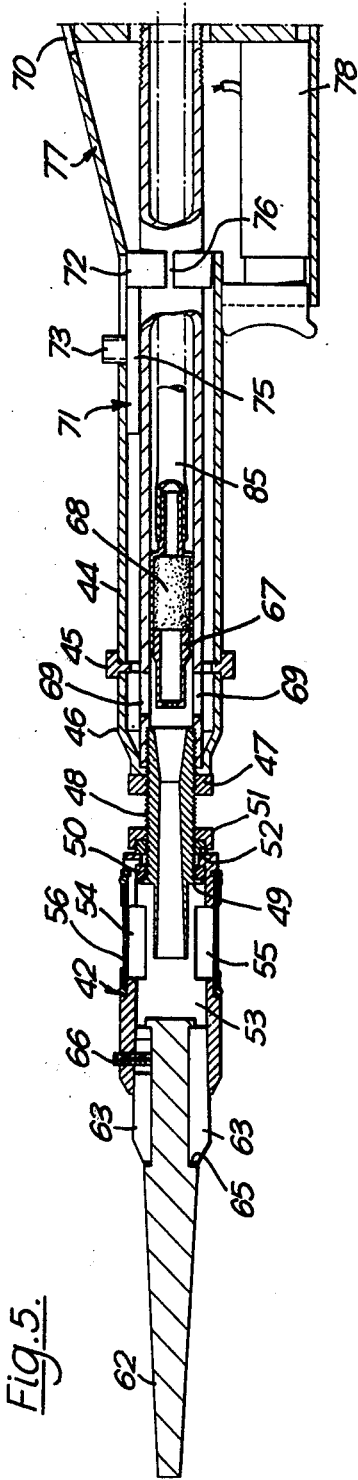
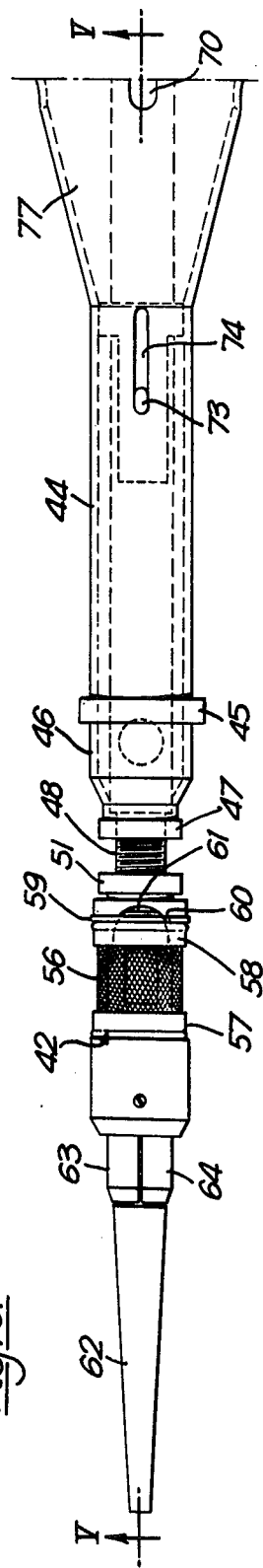
Fig. 5.
Fig. 6.

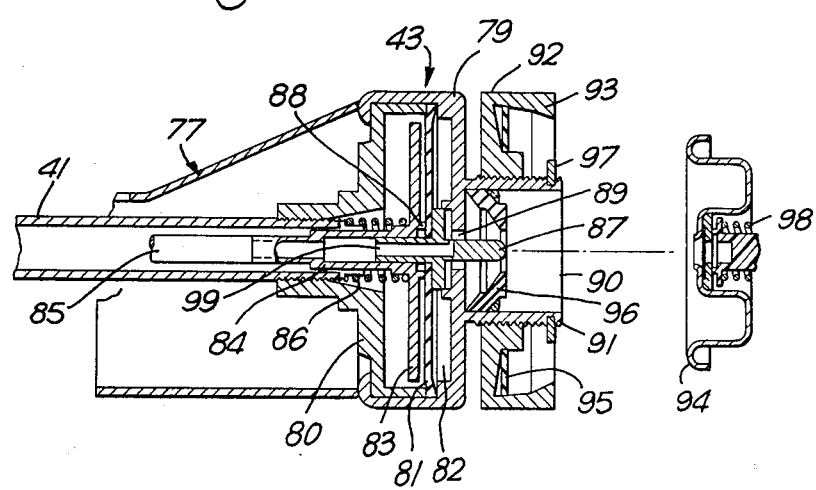

SOLDERING IRONS

This invention relates to gas heated soldering irons.

There are known soldering attachments for gas operated blow lamps which comprise a soldering bit mounted in a metal cap. Such an attachment is fixed to a blow lamp so that the flame heats the cap and the bit, burnt gases escaping through large apertures in the cap. Soldering apparatus of this type is mainly used for heavy-duty soldering, and is not suitable for precision work such as soldering electronic components to printed circuit boards, since the size and weight of the blow lamp makes it difficult to hold steady or manoeuvre accurately. In addition, the blow lamp flame can present a fire hazard, and unburnt gases can be dangerous to a user when undertaking close work. The consumption of gas is also quite considerable.

Further, if it is attempted to use a small flame for reasons of safety or economy, problems arise in maintaining the stability of the flame, particularly if it is pointing downwards. Also since heat is rapidly lost to the surroundings in known apparatus the small flame does not sufficiently heat the soldering bit.

Thus, according to the invention, there is provided a gas heated soldering iron comprising a soldering head, a chamber in said head, means for supplying a gas/air mixture under pressure to said chamber for combustion therein, a flame suppression barrier enclosing said chamber whereby the flame of combustion is contained entirely within said chamber and combustible gases outside said chamber cannot be ignited, and a control mechanism for automatically regulating the pressure of gas supplied for combustion.

It will be appreciated that the head will either be integral with a soldering bit or will have means for holding a bit.

Suitably, the flame suppression barrier comprises a gauze. One or more apertures of larger size than those of the gauze may be provided to serve as an ignition aperture when igniting the gas/air mixture in the chamber; it will be appreciated though that the size of any aperture must be such as not to prevent flame suppression. It has been found in use that a 40—40 gauze (i.e. 40 wires to the inch in each direction) is suitable. A 30—30 gauze would probably also be suitable, but a 20—20 gauze might present a fire hazard. A double gauze arrangement could be used for extra safety. The pressure of gases in the chamber must not prevent a sufficient flow of gas/air mixture into the chamber to give a suitable flame and thus the suppression barrier must allow a suitably free flow of burnt gases.

By means of the invention, several advantages are obtained. Firstly, the soldering iron does not present a fire hazard since the flame burns only within the chamber. Moreover, in use, the iron can be used in an inflammable atmosphere, — for example a petroleum ether/air mixture — the flame not being able to ignite the inflammable gases.

In addition, since air outside the chamber cannot affect the flame, a small flame can be employed which will remain stable. Also, the heat from the flame is to a large extent retained within the chamber, resulting in more efficient heating of the head.

Means are preferably provided thermally insulating the head from the handle of the iron, to enable safer use. In addition, when using the iron in electrical work it is desirable that the handle be electrically insulated from the bit and therefore the head. In one arrangement therefore, the head is electrically insulated from the rest of the iron and the arrangement is such that the flame in the chamber does not bridge the insulation. In another arrangement, the handle is formed by a metallic canister of gas, connected to the head via a metallic stem. The head and the stem are not electrically insulated from each other, but the stem is sheathed in insulating material, such as plastics, and the canister is electrically isolated from the stem. It is possible in this arrangement for the flame to contact the head and provide more efficient heating.

Such electrical isolation of the head from the handle is important for safety reasons, and for preventing stray A.C. fields being picked up by a user, rectified and appearing at a bit as D.C. potentials which could damage sensitive electronic components such as field effect transistors.

The gas/air mixture is preferably supplied to the chamber in the head via a bunsen tube projecting into the chamber. Gas is directed into the tube from a jet, air being drawn in through one or more apertures to give an ignitible gas/air mixture. The aperture may be adjustable, for example by means of a cover such as a sleeve, to vary the flow of air. Such a sleeve slides over the aperture, and is preferably provided with a V- or similar shaped notch to give a finer control.

Means are advantageously provided to prevent fumes as a result of soldering, such as burnt gases issuing from the head or heavy flux fumes, being drawn back into the gas/air mixture, and/or to prevent direct crossdraughts affecting the mixture. In one arrangement, a baffle is provided adjacent the air inlet aperture. In another arrangement the head is attached to the top of a stem which is surrounded by a casing. Apertures into the space between the casing and the stem are provided adjacent the base of the stem, and the inlet apertures communicate with the space. Thus the air is drawn from a position remote from the head, so that burnt gases are not drawn in also. This gives a higher stability flame particularly if the iron is held downwards.

When using a small flame, with gas issuing from a jet at low pressure, problems may be encountered in ensuring that a sufficient amount of air is drawn into the mixture to provide a flame of the required intensity. It is possible to obtain satisfactory results by restricting the length of the bunsen tube to reduce drag and permit a sufficiently fast flow of gas through the tube, to draw in the required amount of air. However the tube must be long enough to give adequate mixing.

It has been found that better results can be obtained by providing a secondary air inlet in the bunsen tube. In one embodiment, the bunsen tube has a tapered lead-in portion into which passes gas which has been mixed with some air drawn in through the primary air inlet. This mixture is accelerated through the remainder of the bunsen tube, and additional air is drawn in through the secondary air inlet.

Although constant adjustment of the secondary air inlet is not generally necessary, means such as a sleeve may be provided to alter the size of the inlet, for example during the initial setting up of the soldering iron. Means are preferably provided to screen the secondary air inlet from direct draughts. This could comprise a sleeve covering the inlet, a groove communicating the inlet with the atmosphere.

The provision of a secondary air inlet does however have one drawback if working at very low temperatures—i.e. very low gas pressures—in highly sensitive environments. This is that a very small leakage of unburnt gas through the secondary air inlet may occur.

To meet this problem, in another arrangement there is no secondary air inlet, but instead the bunsen tube is divergent in the direction of gas flow along a substantial portion of its length. Due to the divergence of the passageway, the gas/air mxiture flowing therealong expands and reduces the back pressure, thus allowing a higher velocity flow and hence a greater intake of air. As the tube heats up during operation of the burner, the cool gases entering the passageway are heated and accelerate towards the flame end of the passageway, thus further enhancing performance. Conceivably for certain working conditions, a secondary air inlet could additionally be provided.

In all arrangements, the bunsen tube is preferably provided with a convergent lead-in portion. The jet from which the gas issues should be coaxial with the bunsen tube for the best results, and the jet outlet should be positioned close enough to the tube to prevent substantial diffusion of gas before entering the tube. Effectively then, a narrow pencil of gas mixed with air is directed down the tube.

It will be appreciated that the bunsen tube need not be separate from the other components of the soldering iron. It may simply comprise a passageway formed for example in a stem of the iron, and/or even in the head of the iron. In preferred arrangements however, the tube is a separate component, attachable to a stem of the iron and to the head.

Preferably, the head is readily detachable from the rest of the iron, for example being held in place by spring clamps, or a screw thread. This enables different heads to be used for different operating conditions.

To enable the iron to be easily handled, in a preferred embodiment it comprises an elongate substantially tubular stem, attachable at one end to a gas container in coaxial relationship therewith, the container being for example cylindrical, and at the other end to the head of the iron, also in coaxial relationship therewith. A gas container may thus serve as the handle of the iron.

In all the embodiments, means may be provided for allowing connection to a gas container. This could be by means of a screw thread. However, in a preferred embodiment a resilient member is provided, adapted to receive and hold a gas container. The member should not permit ready axial removal of the container; however it should permit removal by non-axially directed forces. This provides a rigid connection but prevents damage to the container if it is attempted to use the iron as, for example, a lever. The member may engage round the complete periphery of a container, or only parts thereof. It should preferably not permit easy relative rotation between the container and the member.

Preferably, when the iron has an elongate tubular stem, a jet is positioned in the stem so as to be rotatable relative thereto. In addition, the connection between the jet and a source of gas is by means of a flexible tube within the stem although a rigid or simi-rigid tube could be used. The above mentioned provisions assist in adjustment of the valve mechanism as will be later described. A filter is preferably provided for the gas, and this may be made integral with the jet.

Self igniting means such as a piezo-electric mechanism may be provided.

It is intended that the iron shall operate at very low gas pressures, for example in the range of 1 to 5 p.s.i. or even lower, to give an output equivalent to an electrical iron of approximately 20 to 25 watts. The temperature of the flame should be between 3800° F. and 3900° F. Since the pressure in a typical gas container is about 25 p.s.i. at normal temperatures, the control mechanism provides a means for reducing the pressure, and accurately regulating it to a constant value to give a stable flame.

The control mechanism may comprise a complete valve integral with the body of the soldering iron. However, in the preferred embodiment, the soldering iron is only provided with a valve control means which co-operates in use with the valve in a gas container, so as to provide a differential valve. This means that the only valve seat need be that in the container, which is replaceable in any case, so that the life of the control means on the soldering iron will be increased.

It is evident that such a valve control means has applications other than in conjunction with a soldering iron, and thus according to another aspect of the invention there is provided a valve operating mechanism comprising a body, a chamber formed within said body, one wall of said chamber being defined by a diaphragm, means for sealably receiving a gas container having a depressible valve, with said valve disposed substantially opposite said diaphragm, and said valve and said chamber being in flow communication, a valve operating member mounted for movement with said diaphragm, resilient means biasing said valve operating member so as to exert an opening force on said valve in use, and gas outlet means from said chamber.

Conceivably, the resilient means could comprise any form of spring acting on the diaphragm or the valve operating member, or the diaphragm itself could be arranged to act as a diaphragm spring. Preferably however the resilient means is in the form of a coil spring acting on the centre of the diaphragm on the side remote from said chamber. In this situation, the operating member and the spring are axially aligned. The diaphragm may be provided with a backing washer on which the spring acts, and the valve operating member may extend through the diaphragm to assist in axially locating the spring, or the backing washer may have an axial extension.

The adjusting means may comprise a member movable axially with respect to the spring to alter the compression thereof, and may be in the form of a threaded member engaging in a screw thread formed in the body portion.

The container may be attachable to the mechanism by a screw thread. In one preferred arrangement however, it is clamped by a resilient member, which affords substantial resistance to separation of the container in an axial direction, but no substantial resistance to separation in a non-axial direction. In this arrangement, the resilient member may be movable axially with respect to the operating member, to effect flow adjustment. In a preferred embodiment the member has resilient upstanding portions adapted to engage the periphery of a gas container. The resilient portions may be parts of a continuous flange, or separate elements.

To conserve space, the gas outlet is preferably arranged so that gas flows axially through the mechanism. Advantageously the outlet is then in the form of an axial bore in said valve operating member communicating with said chamber.

When such a valve operating mechanism is used with a soldering iron according to the invention, the body portion may be axially connected to a stem of the iron. The stem could be used to move the adjusting means member, for example by being threadedly engaged with the body portion and acting on the member so that the member is moved as the stem is rotated.

An important safety feature of the valve mechanism is that, if the soldering iron is inverted, liquid gas cannot pass down from a gas container to the head, due to the expandible chamber in the valve mechanism. This prevents dangerous "flare up" in such a situation.

Some embodiments of the invention will now be described with reference to the accompanying drawings, in which:

FIG. 1 is a section through a portion of a soldering iron according to the invention taken on the line I—I of FIG. 3;

FIG. 2 is a side view of the portion of the iron shown in FIG. 1;

FIG. 3 is a top view of the portion of the iron shown in FIG. 1;

FIG. 4 is a section through the base of the soldering iron, showing a valve assembly.

FIG. 5 is a section through a portion of a second embodiment of a soldering iron according to the invention, taken on the line V—V of FIG. 6;

FIG. 6 is a top view of the part of the iron of FIG. 5; and

FIG. 7 is a section through the base of the soldering iron of FIG. 5, showing a second type of valve assembly.

Referring now to the embodiment of FIGS. 1 to 4, the iron consists of four main sections; a tubular handle portion which consists of a gas container shown in part and indicated at 1; a bezel generally indicated 2 which houses part of a valve operating mechanism for the gas container valve and to which the container is attached; a tubular stem portion generally indicated at 3, having an associated heat shield 4; and a head generally indicated at 5 in which a flame will burn to heat a soldering bit 6.

In a working prototype, the complete assembly measures approximately 11 inches in length. The stem and head are approximately 7/16 inch in diameter and slender by comparison with the handle diameter of approximately 1⅜ inches.

The heat shield 4 is frustoconical in shape at a point where it leaves the bezel assembly, and is pressed on to the stem 3 close to an end cap 7 for a distance of approximately ¾ inch. The remaining length of the heat shield 4 is clear of the stem 3 thus protecting it from direct heat. The shield 4 is preferably made of a heat resistant plastics material such as polyphenylene oxide (ppo).

The gas container 1 has a self sealing valve assembly of known construction housed in its top. The valve assembly is fitted with an external screw thread 8 which screws into the bezel 2.

The self sealing valve assembly works in conjunction with a valve operating mechanism 9 to form a differential valve. The housing or body portion of the mechanism comprises the bezel 2 and end cap 7 and is preferably made of a die cast alloy.

Gas may thus be released from the gas container 1 in a controlled manner as follows:

The heat shield 4 is rotated and the stem 3 is thus screwed into a threaded stem of the end cap 7. The corresponding displacement of a bush 10 compresses a spring 11. The force applied by the spring 11 is further transmitted to a diaphram support washer 12 which is preferably made of aluminium. The force applied by the support washer 12 is applied to the centre portion of a diaphram 13, which is preferably made from neoprene sheeting. Pressure from the diaphram 13 is transmitted to a flange 14 creating a gas tight seal. The flange 14 forms part of a centre boss 15 which acts as a valve operating member and in turn extends through an aperture and applies a force to the centre of sealing cap 16 of the self sealing valve assembly in the gas container 1.

If the combined sealing forces acting upon the sealing cap 16, that is to say the gas pressure in container 1 together with the force applied by sealing spring 17 are less than the opposite force applied by the centre boss 15, gas will be caused to leak between the seal 18 and the sealing cap 16. Under these conditions gas will enter chamber 19 between the diaphram 13 and the inner walls of the bezel 2.

The periphery of the diaphram 13 is clamped between a recess wall of the end cap 7 and a recess wall of the bezel 2 causing a gas tight seal.

The gas then filters through a compressed felt filter washer 20 into a capillary tube in the centre boss 15 and so to a flexible feed pipe 21. The tube 21 is preferably made from silicone rubber to withstand heat conducted from the head 5 down the stem 3. The tube 21 is attached to the centre boss 15 by being pushed over a ferrule which is part of the rear of centre boss 15.

The feed tube 21 passes freely through the bush 10 and the spring 11 thus being free to rotate within the stem 3. The gas flows along tube 21 to a jet 22 which is attached to the tube 21 by a parallel junction tube which is part of the rear of the jet 22, thus facilitating the easy removal of the jet 17. Clearances round the jet 22 allow the jet to move freely inside stem 3 to allow unimpeded adjustment of the differential valve assembly.

The gas pressure builds up against small bore orifice 23 of the jet 22. This rise in pressure is transmitted to the chamber 19 and the pressure against the diaphram 13 and its support washer 12 increases to provide a force reactive to the force stored in the spring 11 tending to cancel it. This has the effect of relaxing the force applied by the centre boss 15 to the sealing cap 16 causing it to settle back towards the seal 18. This reduces the flow of gas from the container. The effect is to cause the system to settle down to a constant pressure for any one setting of the control stem 3. Any variation in pressure applied to the spring 11 by the adjustment of stem 3 will cause a corresponding change in pressure at the jet orifice 23. The pressure of gas in the container is typically 25 p.s.i., however the pressure of gas issuing is generally regulated to about 1 or 2 p.s.i. The gas flow through the jet is then about 3 grams per hour, and this is suitable for a power output giving a performance equivalent to that of an electrical iron of approximately 20 to 25 watts.

In the iron being described, the ratio of the working area of the diaphragm to that of the valve seat in the container was 10 : 1, this being considered an optimum minimum. The coil spring used had an 8 lb. loading.

The amount of adjustment applied to spring 11 by the adjustment stem 3 is limited by a nylon screw 24 which moves in a groove 25 cut in the stem of the end of cap 7.

With the stem 3 screwed out of the end of cap 7 and limited by screw 24 no external pressure is applied to the sealing cap 16, and the gas supply is cut off.

If the nylon screw 24 is screwed out of the heat shield 4 for a distance sufficient to clear the groove 25, the stem 3 may be completely unscrewed from the end cap 7, and the jet 22 and its jet tube 21 withdrawn.

With the container valve open, a stream of gas emits from the jet orifice 23 and proceeds along a bunsen tube 26 drawing in air from the main air intake holes 27. At a point approximately halfway along the bunsen tube in its narrow section secondary air intakes 28 are situated. At this point more air is drawn into the gas stream causing a highly aerated gas mixture to emerge at bunsen nozzle 29. The overall air mixture is controlled by regulating main air intakes 27. A split sleeve 30 may move up and down the stem 3 varying the air flow entering the air intakes 27. A V slot 31 indicated in FIG. 3 makes the adjustment less sensitive. The sliding action of sleeve 30 is operated through a plastic control knob 32 which is attached to the sleeve 30 by being pressed on to a barb 33 formed in a right-angled tag which is part of the rear of sleeve 30.

The knob is caused to slide in a longitudinal slot in the heat shield 4. Notch positions may be provided so that the air intakes can easily be set to the correct aperture for various situations, e.g. starting.

The sleeve 30 is placed between the heat shield 4 and the stem 3 and remains clear of the heat shield 4.

The head of the iron generally indicated at 5 slides over the end of the bunsen tube 26 and is rotatable about the bunsen tube 26. The head has a combustion chamber into which the end of the bunsen tube extends. Apertures in the chamber allow the egress of burnt gases, and are covered by a flame suppression gauze 34.

To adjust the air entering the secondary air intake holes 28 the head is rotated so as to obsure or expose the air holes 28 by the edges of a slot in an insulating sleeve 35, described more fully below. This can be a production setting and would remain permanent after the bunsen tube 26 has been pressed into the stem 3 at the same time clamping a spring 36 in a manner described below. The spring 36 would then prevent the head rotating out of the set position.

The adjustment of the secondary air holes may also be left to the user of the iron by allowing the spring 36 to rotate about the stem 3 after the bunsen tube has been pressed into the stem 3. Under these circumstances, the head would be prevented from rotating freely by the friction between an insulating washer 37 and the base of the head 5. The amount of friction would be determined by the tightness of the clamping spring 36.

To ignite the flame at the top of the bunsen tube 26, a flame, flint spark, or electric spark is introduced at a point to the rear of the flame suppression gauze 34 at a point generally indicated by the arrow 38 in FIG. 3. The gauze 34 is preferably made from stainless steel with an excess of 1500 holes per square inch. The flame suppression gauze causes an accumulation of the gas/air mixture within the head some of which filters back out of an ignition aperture created by a slot in the insulator 35, which is in the region indicated by the arrow 38, in FIG. 3.

On ignition the gas burns back under the flame suppression gauze 34 and remains burning in the head of the iron 5.

To assist easy ignition the main air control sleeve 30 is made to restrict some of the air entering the air holes 27 making a richer gas mixture. On ignition the air holes 27 are opened to increase the flame temperature and stability.

After ignition has taken place, the control sleeve 30 is pulled back and the gas aerated to give a hot stable blue flame. Flame temperatures of up to 3900° F. may be obtained with this burner, giving a deep blue flame, tending to violet.

The pressure of the burnt gases trapped within the fine gauze 34 causes them to emit from the ignition aperture at the rear of the head, thus preventing the entry of gases from outside the head through this aperture.

The head 5 is electrically insulated and partially heat insulated by the sleeve 35 which is preferably made from alumina, and washer 37 preferably made from a mica compound. The sleeve 35 is secured in the head 5 by either pressing or rolling over a flange which forms part of the head 5. The gauze 34 is secured in a similar manner as shown at 39. The sleeve is provided with two diametrically opposed slots.

The head 5 is clamped to the stem assembly by the leaf spring 36. The head 5 is first placed over the bunsen tube 26 and spring 36 is pulled clear allowing the head 5 to sit on the washer 37. The spring 36 is released and its bowed sides squeezed inwards thus causing the spring to elongate and latch its hook ends over the ledge created by the base of the slots in the sleeve 35. On releasing the spring 36 the head 5 is drawn down onto the insulated base washer 37. The spring 36 is a one piece formation, preferably made of carbon steel.

Soldering bits 6 preferably made from copper are tapered and driven into a corresponding taper in the head 5 and secured by a wire clip 40. A variety of different shapes and sizes may be fitted. The soldering bits are preferably plated to facilitate easier removal after use.

In order to provide a stable flame, it has been found in practice that certain constructional values and the relationship between such values are important in the construction of the burner. In a number of prototype burners tested, constructional values considered were as follows:

L = distance from the face of the jet to the outlet of the bunsen tube.
L' = the length of the bunsen tube
D = the inside diameter of the outgoing end of the bunsen tube
d = the diameter of the secondary air holes and
J = the distance from the face of the jet to the inlet of the bunsen tube.

In the examples tested, L was approximately 40 mm. The volume of the combustion chamber within the head was about 1cc, and the distance from the outlet of the bunsen tube to the end face of the chamber was 6 mm. This distance must in fact be such that the flame does not bridge the insulation between the bunsen tube and the stem of the soldering iron.

The approximate relationships were as follows:
(a) L'/D = 13/1
(b) Using one secondary air hole, the position was L'/2
(c) Diameter of secondary air hole = D/3
(d) The approach angle of the bunsen tube = 10°
(e) The diameter of the bunsen tube inlet = 1.7D
(f) J = L/10
(g) The position of the main air holes = ½ J
(h) The total area of the main air holes = 3 × cross sectional area of the bunsen tube at its outlet.

Referring now to the embodiment of FIGS. 5, 6 and 7, the iron comprise a tubular stem 41, a head 42, and a valve operating mechanism 43. The stem 41 is sheathed by a plastics insulating casing 44. A heat resistant plastics ring 45 is positioned on the end of the casing, and an aluminium cap 46 is positioned over the stem so as to engage the ring 45. This aluminium cap 46 is held in place by a nut 47 threadedly engaged on a bunsen tube 48 screwed into the end of the stem 41. The aluminium cap thus serves to keep the casing 44 in position by holding it against the casing of the valve operating mechanism 43, and also acts as a heat sink to reduce the heat transmitted down the stem 41.

The head 42 is clamped to the bunsen tube 48. This tube passes with clearance through the base of the head and has a flange 49 against which the base of the head is clamped. A heat insulating washer 50 is provided between the base of the head and the flange 49. Clamping is effected by a nut 51 threadedly engaged on the bunsen tube 48, the nut having a recess containing a heat insulation washer 52.

Thus, the end of the bunsen tube 48 projects into a chamber 53 in the head. This chamber is provided with two apertures 54 and 55, covered by a stiff cylindrical gauze 56. The gauze has end pieces 57 and 58 formed from rolled U-channel aluminium, and is held in place by a split ring 59 engaging in a groove 60 in the head. A cut-out 61 is provided to facilitate igniting of the gas/air mixture in use.

A copper soldering bit 62 is held in the head by means of tapered cotters 63 and 64, located in a groove 65 in the bit and a grub screw 66 threadedly engaged in the head and passing through a clearance hole in the cotters 63 and 64. Should the bit 62 become loose, it would not drop out of the head 42 and the cotters 63 and 64. Three or more cotters could be used if desired.

The tapered cotters accommodate tolerances in the head and the turned copper bit, ensuring a tight fit and good thermal contact. A simple turning operation is all that is required to produce a variety of bits of differing diameter and shape. The bits can be made to fit standard cotters simply by adjusting the depth of the groove in the bit.

The bunsen tube 48 diverges in the direction of gas flow over a substantial portion of its length. In an example of this embodiment, the taper of the bore is 1°30', the tube having an outlet diameter of 0.125 inches and an inlet diameter of 0.100 inches. The tube converges over a short initial portion, this enhancing acceleration of gas through the tube in use and also facilitating manufacture. The tube is shorter than that used in the previous embodiment, having a length L' of 27 mm and having a ratio L'/D, being the ratio of the length of the tube to the outlet diameter, of 9/1.

A jet 67 is mounted in the stem 41, this jet having its outlet aligned axially with the bunsen tube 48. The end cap of the jet is 0.25 mm thick, having a 0.05-0.07 mm jet hole drilled therethrough. The jet 67 is provided with a filter 68 to stop small particles blocking its outlet, this filter being of polyurethane foam or a similar suitable material. The distance L between the face of the jet and the outlet of the bunsen tube is approximately 30 mm.

Between the jet 67 and the entry to the bunsen tube 48, are positioned air inlets 69. Air is drawn in through these inlets, the air flowing through apertures 70 in the base of the casing 44, and up through the space between the casing 44 and the stem 41. Thus, casing 44 permanently shields the air inlets 69 from the ingress of flux fumes or burnt gases. In addition, foreign matter such as particles of dirt cannot pass through the apertures 69, and thereby possibly block the jet 67. The flow of air in the casing helps to cool the casing and stem.

Control of the air flow is effected by an air control member 71 comprising an annular tapered plastics ring 72, movable in the space between the stem and the casing. Movement of the ring is by means of a knob 73 passing through a slot 74 in the casing. Portion 75 covers the exposed part of the slot. The ring 72 is provided with a cut out 76 which determines the air flow for ignition, with the ring entirely within the cylindrical portion of the casing. As the ring 72 is moved out of the cylindrical portion and into the bell-shaped portion 77, a greater air flow is progressively obtained.

A piezo electric device 78 is schematically indicated in FIGS. 5 and 6, being mounted in the bell-shaped portion 77. This may be connected by a wire, not shown, to an electrode, also not shown, positioned in the cutout 61 in the head. Spaces around the piezo electric device may be packed with polyurethane foam to prevent the entry of direct draughts into the bell-shaped portion.

The valve operating mechanism 43 shown in FIG. 7, comprises a metallic housing 79 provided with an end cap 80 of plastics — preferably glass-filled nylon — into which screws the stem 41. Between the end cap 80 and the housing 79 is clamped the periphery of a diaphragm 81 so as to define a chamber 82.

The diaphragm 81 is provided with a plastics, e.g, nylon, backing washer 83. This has an integrally moulded tubular extension 84. To this extension is attached a tube 85 for connection to the jet 67. Around the extension 84 and between the end of the stem 41 and the backing washer 83, extends a coil spring 86 thereby biasing the diaphragm 81 to the right as shown in FIG. 7.

A brass valve operating member 87 is pressed into the extension 84, thereby clamping the diaphragm 81 to the backing washer 83. A rib 88 is provided on the washer 83 to form a gas-tight seal. The member extends through an aperture 89 and into a passageway 90 defined by an extension 91 of the housing 79.

A resilient plastics (e.g. acetyl polymer) gripping member 92 is screwed onto the extension 91. Around the periphery of the member 92 is a flange 93, divided into segments. This flange has inwardly directed angled faces adapted to engage and hold a gas container 94. The arrangement is such that a substantial force is required to remove the container axially, whereas it may fairly readily be removed by being levered sideways, either deliberately to remove the can, or accidentally. A rubber seal 95 is provided to prevent slippage between the container 94 and the gripping member 92, although it is not essential.

Insertion of the container into the gripping member 92 is facilitated by the taper on the flange 93. A collapsible neoprene seal 96 held in place by a sprung plastic or steel split ring, provides sealing between the container and the passageway 90. To control the gas flow, container 94 together with member 92 are rotated either by turning the can or by turning the member 92 (which may be knurled). A stop formed by a circlip 97 prevents outward movement, and inwards movement is limited by engagement of member 93 with the housing 79.

Valve operating member 87 co-operates with conventional valve 98 of the container in a method similar to that in the previous embodiment, gas passing through bore 99 in the operating member 87.

In operation, gas is supplied to jet 67 at a pressure of between 1.7 and 3.5 p.s.i, the nominal flow rate at this pressure being about 2.3 grams per hour of butane, and the output being equivalent to a conventional 25 watt soldering iron.

The cold gas enters the bunsen tube 48 and with the increasing diameter towards the outlet, expands and allows higher velocities through the tube. As the iron reaches high temperatures, for example 200° C., the cool gases entering the bunsen tube are heated, expand, and accelerate towards the end of the tube. The arrangement maintains high aeration at working temperature, around 400° C., thus maintaining a deep blue hot flame over a wide range of temperatures.

With a soldering iron according to the invention, several advantages are obtained over electrical soldering irons, or blow-lamp devices. The iron reaches its working temperature about 2 to 3 times quicker than an equivalent 25 watts electrical soldering iron and even quicker than an equivalent iron when working at lower outputs, yet the fuel consumption is far lower then that of a blow lamp. With the type of container shown, about 14 to 16 hours of life maybe obtained at the low consumption of 2.5 grams per hour when giving a performance equivalent to a 25 watt. electrical iron.

Moreover, the iron is more versatile and easy to handle. It can be used in many situations without having to be connected to a supply of electricity, and provides a greater output than known portable battery operated irons. It is also light and easy to manoeuvre.

The output of the iron is readily adjustable by means of the differential valve, powers of between 10 and 60 watts being obtainable in prototypes. A larger range of outputs maybe obtained by changing the head to one of a different thermal capacity. Various sizes and shapes of bits may be used with the iron.

What we claim is:

1. A gas heated soldering iron comprising a soldering head, a combustion chamber in said head, perforate flame suppression means enclosing said chamber, jet means connectible to a source of pressurized gas, a passage interconnecting said jet means and said chamber, air inlet means for supplying air to said passage at a location remote from said chamber, and gas flow regulating means for supplying gas at an automatically regulated pressure from said source to said jet means.

2. A soldering iron as claimed in claim 1, wherein said passage includes a bunsen tube having a converging lead-in portion downstream from said air inlet means.

3. A soldering iron as claimed in claim 2 wherein said bunsen tube diverges in the direction of gas flow over a substantial portion of its length.

4. A soldering iron as claimed in claim 1 wherein said passage is provided with secondary air inlet means disposed between said air inlet means and said chamber.

5. A soldering iron as claimed in claim 4 including means for shielding said secondary air inlet means from draughts and fumes.

6. A soldering iron as claimed in claim 1 including spark electrode means positioned to ignite the gas/air mixture in the chamber, a piezoelectric device adapted to supply a spark-inducing voltage to the electrode means, and manual operating means for the piezoelectric device.

7. A gas heated soldering iron comprising a soldering head, a combustion chamber in said head, a flame suppression barrier enclosing said chamber, a bunsen tube for supplying a combustible gas/air mixture to said chamber, a jet directing gas into said bunsen tube, an air inlet aperture for supplying air to gas issuing from the jet, air control means for controlling the amount of air drawn in through said air inlet aperture, and a valve mechanism for automatically regulating the pressure of gas supplied for combustion.

8. A soldering iron as claimed in claim 7, wherein said air control means comprises a cover movable over the air inlet aperture.

9. A soldering iron as claimed in claim 8, wherein said cover has a substantially V-shaped notch in an edge which moves over the aperture.

10. A gas heated soldering iron comprising an elongate tubular stem, a soldering head at one end of said stem, a combustion chamber within said head, means at the other end of said stem for releasably receiving a container of pressurized gas to serve as a handle for said soldering iron, means resisting axial release of said container but permitting release under the action of non-axial forces, means for effecting gas flow communication between the interior of the container and said chamber, and means for admitting air to the gas flow to form a combustible mixture.

11. A soldering iron as claimed in claim 10, wherein said means for releasably receiving said gas container includes a holding member having resilient upstanding portions adapted to engage the periphery of the container.

12. A soldering iron as claimed in claim 10, wherein said resilient upstanding portions have downwardly outwardly angled faces for resisting axial removal of the container but permitting non-axial removal.

13. A gas heated soldering iron comprising a stem, a bunsen tube extending from one end of said stem, jet means for supplying gas to said bunsen tube, air inlet means for forming a combustible mixture with said gas, a hollow soldering head having a combustion chamber enclosed by flame suppression means, said bunsen tube having its outlet within said chamber, and means electrically insulating said head from said bunsen tube and said stem.

14. A soldering iron as claimed in claim 13 wherein said head has a radial flange clamped between two axially spaced insulating members disposed about said bunsen tube.

15. A gas heated soldering iron comprising a stem, a soldering head at one end of said stem, a jet for supplying gas to a combustion chamber within said head, means for supplying air to said gas to form a combustible mixture, means disposed at the other end of said stem for releasably receiving a gas container which serves as a handle for said soldering iron, gas flow regulating means for providing an automatically regulated flow of gas from said container, means extending axially of said stem for communicating said gas to said jet, and means operative on rotation of said stem to adjust said gas flow regulating means and vary the pressure of gas supplied to said jet.

16. A soldering iron as claimed in claim 15 wherein said jet is rotatably mounted within said stem and connected to an outlet from said gas flow regulating means by a flexible tube.

17. A gas heated soldering iron comprising a stem, a soldering head at one end of said stem, a jet for supplying gas to a combustion chamber within said head, means for supplying air to said gas to form a combustible mixture, gas flow regulating means at the other end of said stem for providing an automatically regulated flow of gas from a container, means communicating an outlet of said gas flow regulating means with said jet, and a container holding member for releasably receiving a gas container, said holding member being rotatable with respect to said gas flow regulating means and movable axially in response to such rotation, means being effective on rotation of said container and holding member to adjust said gas flow regulating means and vary the pressure of gas supplied to said jet.

18. A soldering iron as claimed in claim 17 wherein said jet is rotatably mounted within said stem and connected to said gas flow regulating means outlet by a flexible tube.

19. A gas heated soldering iron comprising a soldering head, a combustion chamber in said head, perforate flame suppression means enclosing said chamber, jet means in flow communication with a container of pressurized gas, a passage interconnecting said jet means and said chamber for supplying gas from said jet to said chamber, air inlet means for admitting air to said passage at a location remote from said chamber to form a combustible mixture, means for receiving a pressurized gas container having a depressible valve, means for controlledly depressing said valve to release gas from said container, and means responsive to pressure fluctuations in the gas flow to control the force exerted on said valve by said depressing means to ensure an automatically regulated flow of gas to said jet.

20. A soldering iron as claimed in claim 19, wherein said pressure fluctuation responsive means comprises a diaphragm, said depressing means being mounted for movement with said diaphragm, said diaphragm defining one wall of a chamber, means being provided effecting flow communication between said valve and said chamber, gas outlet means fro said chamber being in flow communication with said jet, and resilient means being arranged for biasing said depressing means into opening contact with said valve.

21. A soldering iron as claimed in claim 20, including means for altering the biasing force exerted on said depressing means by said resilient means.

22. The soldering iron as claimed in claim 4, including means for adjusting the flow of air through said secondary air inlet.

23. A soldering iron as claimed in claim 1 including a soldering bit secured in said head by a plurality of tapered cotters.

24. A gas heated soldering iron comprising an elongate stem, a soldering head at one end of the stem, carrying means adapted to receive a container of pressurized gas at the other end of the stem, a combustion chamber in said head, flame suppression means enclosing said chamber, jet means connectible to a source of pressurized gas, a passage interconnecting said jet means and said chamber, air inlet aperture means into said passage remote from said chamber for supplying air to gas issuing from said jet means, an insulating casing surrounding said stem and shielding said air inlet aperture means, said casing being spaced from said stem and defining an air-flow conduit from one end of said stem to the other, and means for admitting air into the conduit being provided adjacent the said other end of the stem.

25. A soldering iron as claimed in claim 24, wherein said casing has an enlarged portion adjacent the said other end of the stem, said iron including an air control member surrounding said stem and having surfaces adjacent said stem and said casing when in the portion of the casing other than said enlarged portion, said air control member having a cut-away portion allowing a restricted flow of air to said air inlet aperture means, and being movable along said stem into the enlarged portion of the casing to control flow of air through said air inlet aperture means.

26. A soldering iron as claimed in claim 4, including gas flow regulating means for supplying an automatically regulated flow of gas from said source to said jet means.

* * * * *